May 17, 1966   F. J. HOFMANN ETAL   3,251,589
CONVERTER ROTATING IN A SLOPING POSITION
AND TILTABLE ABOUT A CROSS-AXIS
Filed Nov. 2, 1962                     3 Sheets-Sheet 1

Inventors:
Fritz J. Hofmann
Alex Alexander
Roy
Attorney

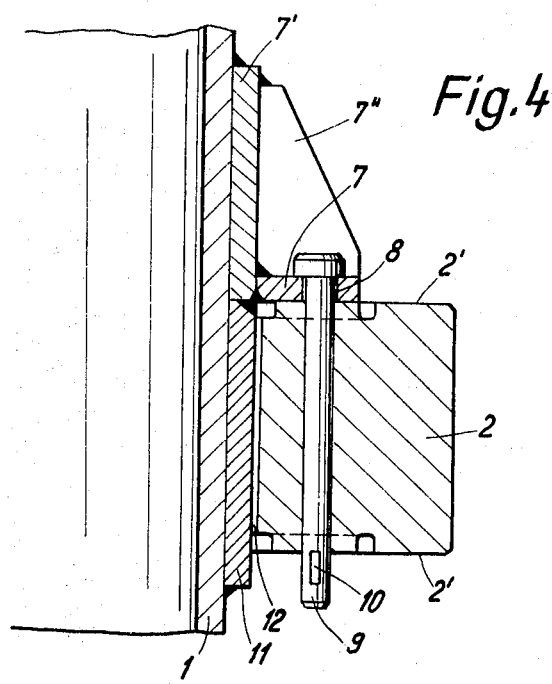
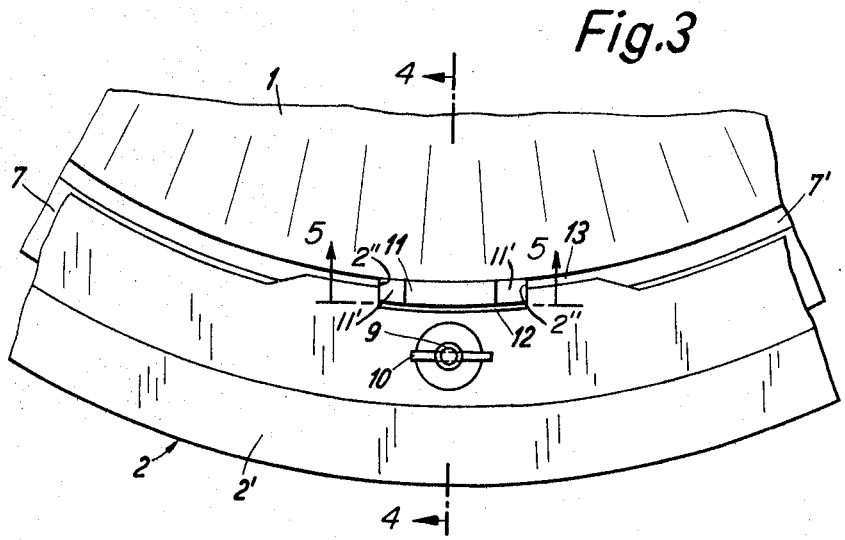

United States Patent Office 3,251,589
Patented May 17, 1966

3,251,589
CONVERTER ROTATING IN A SLOPING POSITION AND TILTABLE ABOUT A CROSS-AXIS
Fritz J. Hofmann, Essen-Bredeney, and Alex Alexander, Essen, Germany, assignors to Beteiligungs- und Patentverwaltungsgesellschaft mit beschrankter Haftung, Essen, Germany, a corporation of Germany
Filed Nov. 2, 1962, Ser. No. 235,000
Claims priority, application Germany, Dec. 14, 1961, B 65,166
2 Claims. (Cl. 266—36)

The present invention relates to a converter rotating in a sloping position and tiltable about a cross-axis.

Converters are known, which rotate in a sloping position and which are tiltable. These known converters are rotatably mounted on rollers supporting two bearing rings. This mounting has the drawback, that the construction is extremely uneconomical, the converter is not easily accessible and is exchangeable only with appreciable difficulties.

It is one object of the present invention to provide a mounting for a converter rotating in a sloping position and tiltable about a cross-axis, which avoids the drawbacks of the known structures.

It is another object of the present invention to provide a mounting for a converter rotating in a sloping position and tiltable about a cross-axis, wherein the converter is mounted with a single bearing ring supported by two supporting rollers and rockers, respectively, and in which this bearing ring is guided on its parallel side faces disposed perpendicularly to the axis of rotation by at least three pairs of guide rollers.

With these and other objects in view, which will become apparent in the following detailed description, the present invention will be clearly understood in connection with the accompanying drawings, in which:

FIG. 3 is a fragmentary end view of the bearing ring indicating the connection between the bearing ring and the converter shown at enlarged scale;

FIG. 4 is a section along the lines 4—4 of FIG. 3 and

Figure 1:
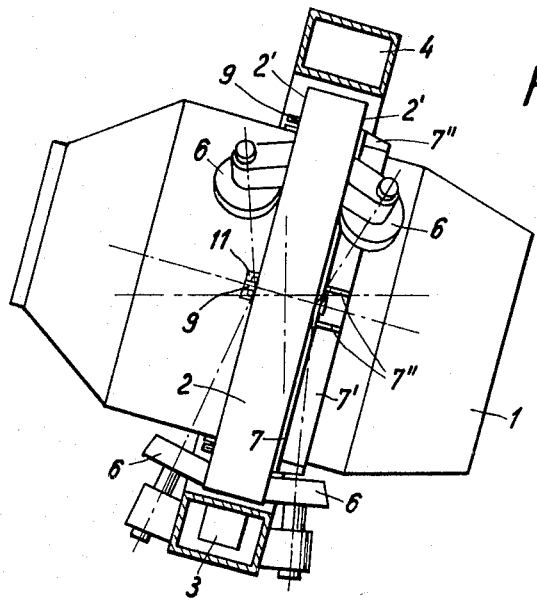
FIGURE 1 is a side view of the converter.
Figure 2:
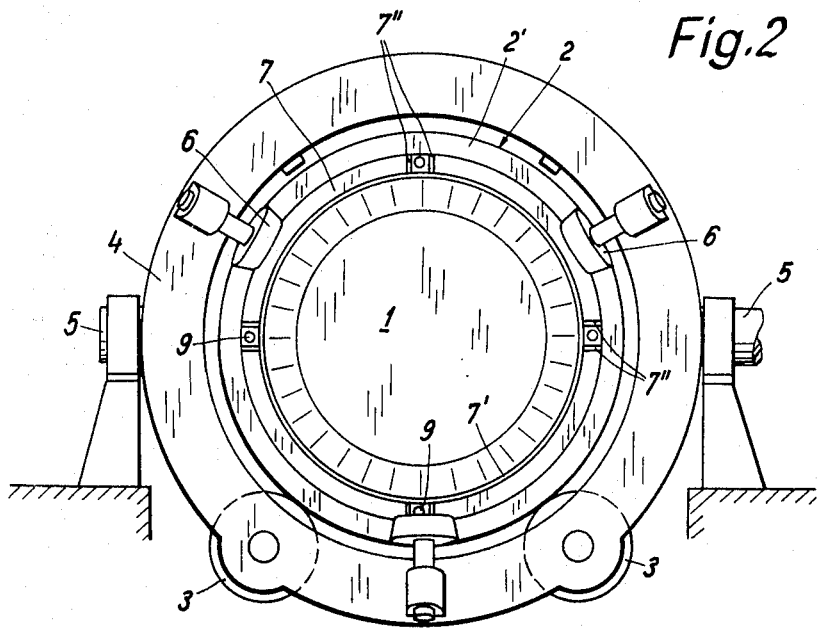
FIG. 2 is a front end view of the converter seen in the direction of the axis of rotation.

Referring now to the drawings, the converter 1 is surrounded by a bearing ring 2 supported by two rollers 3, which simultaneously serve the purpose of rotating the converter 1. Instead of providing the two individual supporting rollers 3, it is also possible to apply two rollers each mounted in rockers.

The supporting rollers 3 are mounted in a frame 4 which permits the tilting of the converter 1 about the pivots 5. Three pairs of guide rollers 6 are likewise mounted in the frame 4. The guide rollers 6 engage the oppositely disposed parallel side faces 2' of the bearing ring 2, which side faces 2' are disposed perpendicularly to the axis of rotation of the bearing ring 2. The supporting rollers 3 assume the vertical forces encountered by the converter 1 and the three pairs of guide rollers 6 assume the moment changeable by the occurring displacements of the center of gravity.

In order to avoid a sliding friction between the bearing ring 2 and the guide rollers 6, it is required that the peripheral velocity is equal at all engaging points between the guide rollers 6 and the side faces 2' of the bearing ring 2. This is brought about in such manner that the axes of rotation of the guide rollers 6 cross the planes of the side faces 2' of the bearing ring 2 at the same point at which the axis of rotation of the bearing ring 2 and, thus, of the converter 1, crosses the planes of the side faces 2'.

In accordance with another feature of the present invention, the bearing ring 2 is secured to the converter 1 in such manner, that the transmission of the forces from the bearing ring 2 to the converter 1 and vice versa is brought about, without causing difficulties due to the difference in the heat expansion of the parts to be connected.

As may be ascertained from FIGS. 3 and 4, the jacket of the converter 1 is equipped with a flange 7, secured thereto, for instance, by welding, which flange 7 has a base part 7', openings or bores 8 and ribs 7''. Bolts 9 are inserted through these openings 8 into corresponding bores of the bearing ring 2 and are secured thereto by means of cotter pins 10 or the like. The openings 8 are of such dimension, that they can assume the heat expansion of the jacket of the converter 1. The bearing ring 2 is additionally retained in its position by means of wedge members 11. The bearing ring 2 is reinforced within the range of the wedge members 11 for the deception of the latter in such manner, that a sufficient space 12 remains between the wedge member 11 and the bearing ring 2 and also that a sufficient space 13 remains between the jacket of the converter 1 and the bearing ring 2. The wedge members 11 transmit the forces which are created by the rotation of the converter 1, as well as by the heat expansion of the latter and must be assumed by the bearing ring 2. The flange 7 transmits in conjunction with the bolt 8 the occurring moments, which moments are created particularly by the occurring displacements of the center of gravity at a changeable value and direction.

Figure 5:
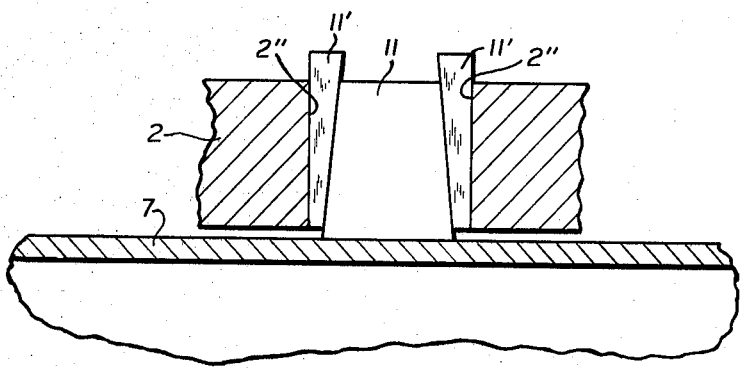
FIG. 5 is a section along the lines 5—5 of FIG. 3.

As clearly shown in FIG. 5, the bearing ring 2 is retained in position by the wedge members 11 and 11'. The wedge members 11 are secured to the jacket of the converter 1, for example, by welding. The wedge members 11' are driven into the space disposed between the wedge members 11 and the bearing ring 2 and engage thereby the faces 2'' of the bearing ring 2.

The converter 1, designed in accordance with the present invention, it is to be understood that this embodiment simplified construction, a better accessibility and exchangeability, the further advantage, that it can be subjected to a better control during operation and that it shows a better reflection, as well as, due to the easier air access, has a better heat emission.

While we have disclosed one embodiment of the present invention, it is to be understod that this embodiment is given by example only and not in a limiting sense, the scope of the present invention being determined by the objects and the claims.

We claim:

1. A mounting for a converter rotating in a sloping position and tiltable about a cross-axis, comprising
    a converter having a jacket,
    a single bearing ring surrounding said converter,
    a frame surrounding said bearing ring,
    two roller means rotatably mounted in said frame and supporting said single bearing ring for a rotary movement of said converter,
    said single bearing ring having parallel side faces disposed perpendicularly to the axis of rotation of said converter,
    at least three pairs of guide rollers mounted on said frame and engaging said side faces of said bearing ring for guiding the latter during its rotation, and the axis of rotation of each of said guide rollers extending through the crossing point of the planes of said side faces of said bearing ring with the axis of rotation of said bearing ring, in order to assure that the peripheral velocity of said bearing ring and of said guide rollers is equal at all engaging points between said bearing ring and said guide rollers.

2. The mounting, as set in forth in claim 1, which includes
   a flange extending from said converter perpendicularly to the axis of rotation of said converter,
   a bolt extending through said flange and through said bearing ring in a direction parallel to the axis of rotation of said bearing ring, and
   a wedge member disposed between the inner face of said bearing ring and the outer face of said converter providing a predetermined space between said wedge member and said bearing ring and also providing a predetermined space between said converter and said bearing ring, in order to transmit the radial and tangential forces from the jacket of said converter to said bearing ring caused by the rotation and the heat expansion of the jacket of said converter substantially by means of said wedge member and the moments occurring by the displacements of the center of gravity substantially by means of said flange.

References Cited by the Examiner

UNITED STATES PATENTS

| | | | |
|---|---|---|---|
| 2,902,358 | 9/1959 | Kalling et al. | 266—36 X |
| 3,000,621 | 9/1961 | Puxkandl | 266—36 X |
| 3,022,142 | 2/1962 | Sackett | 23—286 X |
| 3,163,696 | 5/1962 | Johnsson et al. | 266—36 |

FOREIGN PATENTS

| | | |
|---|---|---|
| 429,562 | 5/1935 | Great Britain. |
| 507,200 | 6/1939 | Great Brtain. |
| 776,962 | 7/1957 | Great Britain. |
| 812,258 | 4/1959 | Great Britain. |

JOHN F. CAMPBELL, *Primary Examiner.*

MORRIS O. WOLK, *Examiner.*